United States Patent
Thoma

[15] 3,685,368
[45] Aug. 22, 1972

[54] BEARING SYSTEM FOR MINIMIZING SHAFT TILTING

[72] Inventor: Frederic A. Thoma, Harbourton, N.J.

[73] Assignee: De Laval Turbine Inc., Trenton, N.J.

[22] Filed: Feb. 9, 1971

[21] Appl. No.: 114,007

[52] U.S. Cl. .................................74/410, 115/34 R
[51] Int. Cl. .........................F16h 57/00, B63b 35/30
[58] Field of Search.......................74/410; 115/34 R

[56] References Cited

UNITED STATES PATENTS 3,435,694   4/1969   Phinney................74/410 UX
3,559,498   2/1971   Narsted......................74/410

Primary Examiner—Leonard H. Gerin
Attorney—Smith, Harding, Earley & Follmer

[57] ABSTRACT

In order to reduce the tilting of the section of a ship's shafting system which carries the main drive gear and thereby improve the load distribution between meshing gear teeth, a bearing system is provided comprising a pair of ordinary cylindrical journal bearings, one on either side of the main drive gear, and a pair of additional bearings, each located next to one of the cylindrical journal bearings. The latter bearings serve to provide a spring scale in the horizontal direction sufficient to reduce tilting of the main gear shaft section.

5 Claims, 5 Drawing Figures

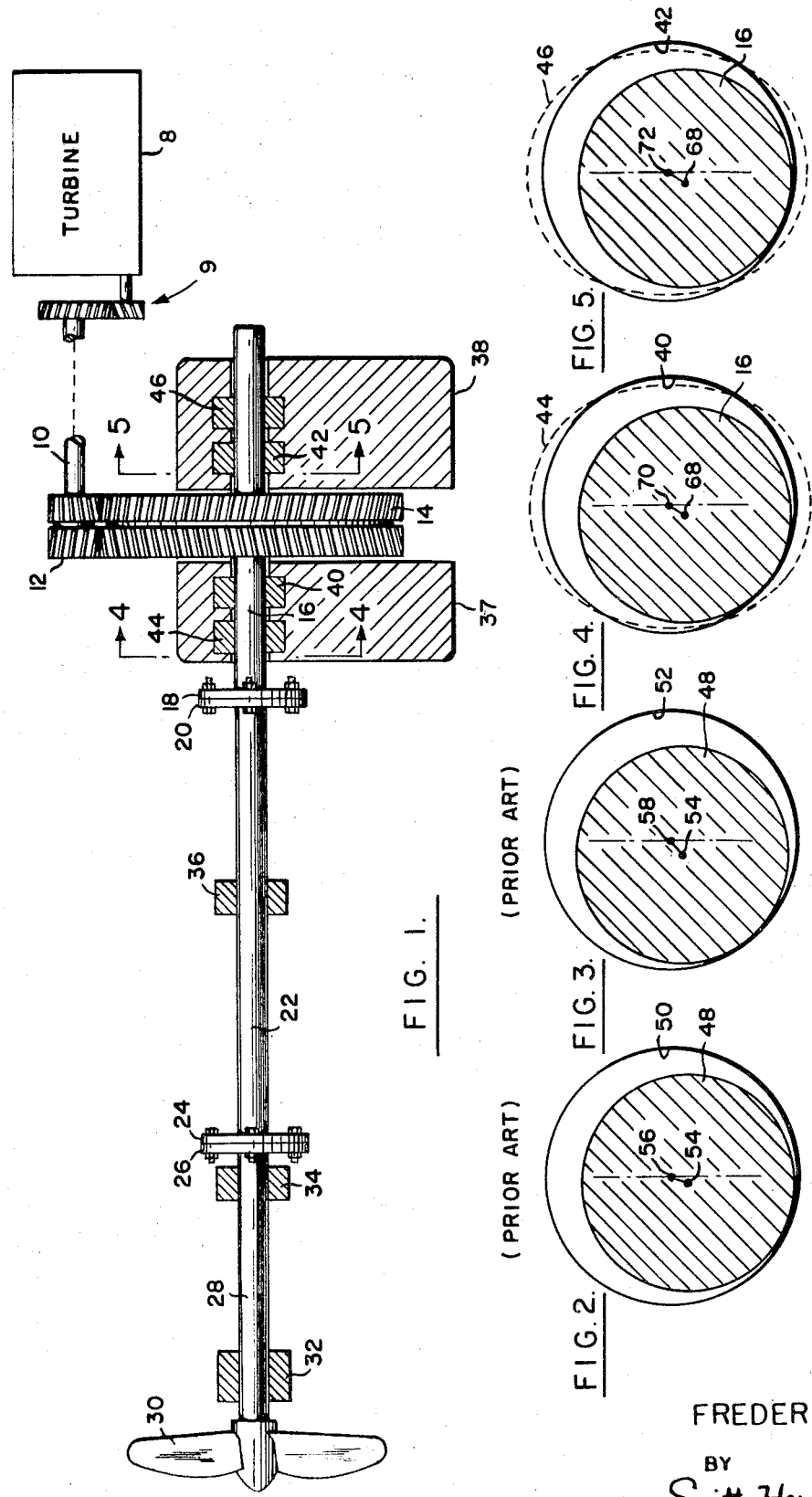
INVENTOR
FREDERIC A. THOMA
BY
Smith Harding Earley & Follmer
ATTORNEYS

BEARING SYSTEM FOR MINIMIZING SHAFT TILTING

BACKGROUND OF THE INVENTION

This invention relates to bearing systems and particularly to a bearing system for minimizing the tilting of the gear-carrying section of a ship's propeller drive shafting system.

The typical propulsion system for driving a propeller in a large ship comprises an engine, usually a turbine, and a drive train generally comprising two stages of reduction gearing. A second reduction pinion driven by the first reduction stage meshes with a large-diameter main drive gear. Line shafting connects the shaft of the main drive gear to the propeller. The main gear shaft, the line shafting, and the propeller shaft are all journalled in bearings supported at spaced locations along the shafting. Usually a cylindrical journal bearing is provided on the main gear shaft on either side of the main drive gear. A typical cylindrical journal bearing used for this purpose has a spring scale in the order of $50 \times 10^6$ pounds per inch in the direction of the load, but the stiffness in other directions is considerably less because of the larger clearances in those directions between the shaft and the bearing.

In large ships, very high engine horsepowers are involved, and the gears transmit large amounts of torque. There is a trend toward the use of large diameter shafting and relatively short shaft systems, and a typical diameters for a main gear shaft journal are 24 to 36 inches. The main drive gear is typically 12 to 16 feet in diameter.

It should also be noted at this point that, while single engine systems are often used, two or more engines may be used as well. In the case of multiple engines, separate first stages of reduction gearing are used, but each such first stage drives a pinion which meshes with the main drive gear in the propeller shafting system. In either case the pinion or pinions are usually positioned above the axis of rotation of the main drive gear because of various considerations in the ship's design. In the single engine design, the pinion is typically directly above the axis of the main drive gear, while in a dual-engine design, the drive pinions are typically equally spaced from a vertical plane in which the main drive gear shaft axis lies.

In the ship's drive systems just described, the deviation of any bearing from its optimum position, particularly the bearing located just aft of the main drive gear shaft, causes a change in the load distribution between the bearings and in the bending moments existing in the shafting. The deviation may result from hull movements, ballasting, or thermal expansion or contraction as well as from other causes. As a result of any such deviation, there may be produced a bending moment tending to tilt the main drive gear shaft within the clearance of its bearings. Such tilting will result in poor load distribution between the teeth of the main drive gear and the teeth of the pinion or pinions meshing with it. Such poor load distribution may result in the production of noise, wear or tooth breakage.

This is a widely recognized problem associated with shipbuilding and the maintenance of ships' propulsion machinery. The problem of tilting becomes more significant in relatively stiff shafting systems, i.e., shafting systems having shorter lengths, large diameters or both.

SUMMARY OF THE INVENTION

It is the fact that the pinion and main drive gear axes are vertically separated which aggravates the condition of poor load distribution resulting from the tendency of the main gear shaft to tilt. By way of explanation, if the pinion axis and the main drive gear axis are at the same height, the resultant of pinion force vectors has no substantial horizontal component.

Since the main gear shaft weight vector is vertical, the main force vectors in the two main gear shaft bearings, which are resultants of the weight vectors and the pinion force vectors, are also vertical. A vertical disturbing force has no effect because of the predominance of the downward total vector. A horizontal disturbing force may produce some tilting, but it is not aided by the pinion forces in doing so.

On the other hand, where one or more pinions are arranged in such a way that their axes are vertically separated from the main drive gear axes the resultant force vector is generally not vertical (with the exception of a few special cases where horizontal components cancel each other). Rather, it is displaced from the vertical by an angle dependent on the rotational speed of the shaft as well as a number of other factors. Any disturbing moment acting on the main drive gear shaft tends to cause the main force vectors in the respective main gear shaft bearings to rotate in opposite directions. This causes a movement of the shaft centers within the respective bearings in opposite directions corresponding to a tilting of the main gear shaft and the main drive gear carried by it. The tilt of the shaft is typically greater in the horizontal direction than in the vertical because the resultant of the main force vectors is generally more nearly horizontal than vertical. The horizontal effect is generally greater than the vertical irrespective of the direction of the disturbing moment.

A solution to the problem of tilting of the main drive gear shaft is provided in accordance with this invention by the use of special bearings which increase the horizontal stiffness of the main drive gear shaft. Preferably, these are in the form of elliptical bearings arranged next to the cylindrical journal bearings and having their minimum clearances in the horizontal direction. The special bearings are preferably positioned along the main drive gear shaft so that each is separated from the main gear by one of the journal bearings. The spring scale of each special bearing in the horizontal direction is such that it allows less horizontal shaft movement than would be allowed by its associated journal bearing acting alone. A mounting is provided on each side of the main drive gear so that foundation movements and hull deflections produce identical movements of the two associated bearings on each side of the main drive gear. The two sides, however, are capable of independent movement, being interconnected only through the hull structure.

While a reduction of the clearance of the cylindrical bearings would result in a restraining effect against horizontal tilting of the shaft, it will be apparent that such reduction would represent a deviation of the cylindrical bearings from the optimum oil film thickness for proper running and would therefore increase friction. On the other hand, in accordance with the invention, the use of additional bearings having increased horizontal stiffness but relatively low stiffness in the vertical direction allows proper operation of cylindrical bearings of optimum size, and will not adversely affect the proper support of the shaft.

The principal object of this invention, therefore, is the provision of a bearing system which minimizes the tilt of a large diameter gear-carrying drive shaft, maintains the gear and pinion axes parallel to each other, and thereby provides a more uniform gear tooth contact when the shaft is subjected to an external bending moment.

Further objects include the reduction of wear, tooth breakage and noise, the maintenance of proper shaft support in a bearing of optimum size, and the maintenance of proper lubrication.

Other objects will be apparent from the following description when read in conjunction with the drawings.

BRIEF DESCRIPTION OF THE DRAWINGS

FIG. 1 is a partially diagrammatic elevation of a propeller drive system, showing various bearings and supports in vertical section;

FIG. 2 is an exaggerated radial section of a main drive gear shaft supported in a cylindrical bearing in accordance with the prior art;

FIG. 3 is another exaggerated radial section of the same drive shaft in accordance with the prior art showing its relationship with another cylindrical bearing on the other side of the main drive gear;

FIG. 4 is a partially diagrammatic exaggerated radial section of the main drive gear shaft supported on one side of the main gear in accordance with the invention by an elliptical bearing shown in broken lines as well as by a cylindrical bearing; and FIG. 5 is a view similar to FIG. 4 showing the relationship between the shaft and the elliptical and cylindrical bearings on the other side of the main drive gear.

DESCRIPTION OF THE PREFERRED EMBODIMENT

FIG. 1 shows diagrammatically a conventional turbine 8 coupled through a first stage 9 of reduction gearing and through shaft 10 to a double helical drive pinion 12. Drive pinion 12 is in mesh with a large-diameter main drive gear 14.

The main drive gear is fixed to a shaft 16. Shaft 16 is part of the ship's propeller shafting system and is connected through flanges 18 and 20 to line shaft 22. Line shaft 22 is connected through flanges 24 and 26 to a propeller shaft 28 which drives a propeller 30. The axis of rotation of the shafting is generally horizontal.

The propeller shaft 28 is supported in bearings 32 and 34. The line shaft is supported in bearing 36. The bearing arrangement described so far is typical, but numerous alternative bearing arrangements can be used as well.

The main drive gear shaft 16 is supported by a number of bearings held in a bearing supporting structure comprising elements 37 and 38. The main support bearings 40 and 42, which are closest to the main drive gear 14, are cylindrical journal bearings. In accordance with the prior art, a pair of journal bearings would be used alone to support the gear shaft. However, in accordance with this invention, there are provided additional bearing means 44 and 46, one on each side of the main drive gear 14, and each further away from the main gear than the cylindrical journal bearings.

Each of bearing means 44 and 46 has a spring scale in the horizontal direction such that the allowable horizontal movement of the section of shaft which it supports is less than that which would be allowed by the journal bearing on the same side of gear 14 acting without the aid of the additional bearing means. Bearing means 44 and 46 may take several forms. For example, each may stiffness an elliptical bearing symmetrically arranged with respect to the adjacent journal bearing, and so arranged that its minimum clearance is substantially in the horizontal direction. Several alternatives are available including tilting pad hydrodynamic shoes and hydrostatic bearing segments. Whichever is used, it is necessary to provide a horizontal stiffness acting on the shaft which is greater than that provided by the cylindrical bearings in order to effect an improvement in the way of reduction of tilting of the main gear shaft. The vertical clearance and the stiffness of the additional bearings in the vertical direction is not critical except that the vertical clearance should not be so small that the additional bearing is the mere equivalent of another cylindrical bearing having a smaller clearance than the main cylindrical bearings.

The elliptical bearing typically has a smaller horizontal clearance but a larger vertical clearance than its associated cylindrical bearing. Preferably the cylindrical bearings and their associated additional bearings are symmetrically aligned.

Each of elements 37 and 38 is fastened to the ship's structure, and each element provides a direct connection between the associated bearings on one side of the gear so that the associated bearings remain aligned with each other regardless of hull deflections or foundation movements.

The operation of the invention will be apparent from a comparison of FIGS. 2 and 3 on the one hand with FIGS. 4 and 5 on the other. FIGS. 2 and 3 show two different radial sections of a shaft 48 located inside cylindrical bearings 50 and 52. The shaft axis is indicated at 54 and the bearing centers at 56 and 58 respectively. A line is drawn between the bearing axes and the shaft axis in both diagrams. It will be apparent that the line in FIG. 3 is further removed from the vertical than the corresponding line in FIG. 2, indicating a tilting of shaft 48 resulting from an external moment. The lines are separated by a substantial angle, and it will be observed that the two points along the shaft axis 54 within the respective bearings, while greatly separated in the horizontal direction, are not greatly separated in the vertical direction.

In accordance with the invention, the cure for this condition is effected by the horizontal restraint imposed by the additional bearing means 44 and 46 indicated respectively in FIGS. 4 and 5, which show the relationship between shafts and bearings under the influence of the same disturbing moment as existed in the case of FIGS. 2 and 3. In this case, the additional bearing means have a horizontal clearance smaller than that afforded by the respective cylindrical bearings 40 and 42. The spring scale of each of bearing means 44 and 46 in the horizontal direction is such that the allowable horizontal movement of the shaft section held thereby is less than that which would be allowed by the adjacent cylindrical journal bearing acting alone. The axis of shaft 16 is indicated at 68 in both of FIGS. 4 and 5, and the cylindrical bearing axes are indicated respectively at 70 and 72. Again, lines are drawn between the cylindrical bearing axes and the shaft axis, and it will be noted that they are approximately in the same direction.

The additional bearing means are preferably located immediately adjacent the load-carrying cylindrical bearings 40 and 42 i.e., within 2 to 4 inches. The additional bearing means are mounted in the same supporting structure as the main load-carrying bearings so that thermal movement of the foundations, as well as deflection of the ship's hull moves each main load-carrying bearing and its adjacent additional bearing means as if they were a single bearing.

As mentioned previously, where elliptical bearings are used, they are preferably arranged so that the minimum clearance is in the horizontal direction. Where hydrostatic segments or tilting shoes are used, they need only be provided at the sides of the shaft in order to restrict horizontal movement; none need be provided above or below the shaft to restrict vertical movement.

In summary, by increasing the horizontal stiffness of the bearing system supporting the main drive gear shaft, the axes of the main drive gear and its pinion or pinions can be kept in good parallel alignment despite the existence of external bending moments acting on the shaft. By using additional bearing means supplementing the journal bearings, the increase in horizontal stiffness is accomplished without effecting a large increase in bearing friction. Horizontal stiffness is the critical factor which must be improved in order to reduce tilting, and this improvement is accomplished by the use of additional bearings having a spring scale in the horizontal direction chosen in order to effect an improvement in horizontal stiffness.

It will be apparent that numerous modifications can be made with respect to the main load bearings and the additional bearing means while obtaining the advantages of the horizontal restraint against shaft tilting afforded by the invention.

I claim:

1. A power transmission for use in a ship's drive system comprising
   a rotatable shaft
   a large diameter gear mounted on said rotatable shaft and adapted to mesh with at least one pinion rotated by an engine,
   a pair of journal bearings supporting said shaft for rotation about a generally horizontal axis, said journal bearing being arranged on said shaft on opposite sides of said gear, and
   means located along said shaft on both sides of said gear for increasing the horizontal stiffness of said shaft.

2. A power transmission according to claim 1 in which said means for increasing stiffness comprises a pair of elliptical bearings having their minimum clearances substantially in the horizontal direction.

3. A power transmission according to claim 1 in which said means for increasing stiffness comprises a pair of bearings positioned along said shaft so that each is separated from said gear by one of said journal bearings.

4. A power transmission according to claim 1 in which said means for increasing stiffness comprises a pair of bearings supporting said shaft on opposite sides of said gear, each of the last-mentioned bearings having a spring scale in the horizontal direction such that the allowable horizontal movement of the section of shaft supported thereby as a result of any given force is less than that which would be allowed by the journal bearing on the same side of the gear acting alone.

5. A power transmission according to claim 1 in which said means for increasing stiffness comprises a pair of stiffening bearings positioned along said shaft on opposite sides of said gear, means mounting the journal bearing and the stiffening bearing on each side of said gear and preventing independent movement of the said journal bearing and stiffening bearing as a result of foundation movements and hull deflections.

* * * * *